(12) United States Patent
Tanaka et al.

(10) Patent No.: US 11,984,270 B2
(45) Date of Patent: May 14, 2024

(54) MOLD, MANUFACTURING DEVICE, AND MANUFACTURING METHOD FOR MANUFACTURING MOLDED BODY

(71) Applicant: Panasonic Intellectual Property Management Co., Ltd., Osaka (JP)

(72) Inventors: Toru Tanaka, Kumamoto (JP); Takashi Sato, Osaka (JP); Hayato Kato, Kumamoto (JP); Kazuhito Odane, Saga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 368 days.

(21) Appl. No.: 17/335,116

(22) Filed: Jun. 1, 2021

(65) Prior Publication Data
US 2021/0283684 A1 Sep. 16, 2021

Related U.S. Application Data

(63) Continuation of application No. PCT/JP2019/050459, filed on Dec. 24, 2019.

(30) Foreign Application Priority Data

Dec. 28, 2018 (JP) .................. 2018-246630

(51) Int. Cl.
B22F 5/12 (2006.01)
B22F 3/00 (2021.01)
(Continued)

(52) U.S. Cl.
CPC .......... *H01G 9/0029* (2013.01); *B22F 3/004* (2013.01); *B22F 3/11* (2013.01); *B22F 5/12* (2013.01); *H01G 9/052* (2013.01); *H01G 13/00* (2013.01)

(58) Field of Classification Search
CPC ...... H01G 9/0029; H01G 9/052; H01G 13/00; B22F 3/004; B22F 3/11; B22F 5/12; B22C 9/06; B22C 9/00
(Continued)

(56) References Cited

U.S. PATENT DOCUMENTS 2,655,409 A * 10/1953 Baldanza ............... A46D 3/005
264/243
4,113,824 A * 9/1978 Matsui .................. B29C 43/102
264/321
(Continued)

FOREIGN PATENT DOCUMENTS

| JP | 8-267516 A | 10/1996 |
|----|------------|---------|
| JP | 10-163074  | 6/1998  |
| JP | 2007-073570 | 3/2007 |

OTHER PUBLICATIONS

International Search Report of PCT application No. PCT/JP2019/050459 dated Feb. 25, 2020.
(Continued)

Primary Examiner — Anatoly Vortman
(74) Attorney, Agent, or Firm — Rimon P.C.

(57) ABSTRACT

A mold includes a pair of first mold parts, a pair of second mold parts, and a pair of third mold parts that define six surfaces of a molded body substantially having a rectangular parallelepiped shape. At least one of the pair of third mold parts includes an upper mold part and a lower mold part. The upper mold part defines an upper space of a molding space, and the lower mold part defines a lower space of the molding space. The upper mold part and the lower mold part are individually slidable. The lower mold part protrudes toward the molding space with respect to the upper mold part so that a step portion is formed. The upper mold part is slidable in
(Continued)

cooperation with the lower mold part in a state in which the step portion is formed or absent.

7 Claims, 15 Drawing Sheets

(51) Int. Cl.
    *B22F 3/11*           (2006.01)
    *H01G 9/00*          (2006.01)
    *H01G 9/052*         (2006.01)
    *H01G 13/00*        (2013.01)
(58) Field of Classification Search
    USPC ........................................................ 361/523
    See application file for complete search history.

(56) References Cited

U.S. PATENT DOCUMENTS

| | | | | |
|---|---|---|---|---|
| 4,141,615 A * | 2/1979 | Takeuchi | ................. | H05K 5/04 |
| | | | | 439/578 |
| 5,949,639 A * | 9/1999 | Maeda | ................... | H01G 9/052 |
| | | | | 361/523 |
| 6,394,779 B1 * | 5/2002 | Komazawa | ....... | B29C 45/14418 |
| | | | | 425/572 |
| 2005/0122663 A1 * | 6/2005 | Poltorak | ................. | B30B 11/34 |
| | | | | 361/528 |
| 2006/0162384 A1 * | 7/2006 | Yamanaka | .............. | C03B 11/02 |
| | | | | 65/102 |
| 2013/0095299 A1 * | 4/2013 | Evans | .................... | H01G 9/012 |
| | | | | 205/333 |
| 2014/0001673 A1 * | 1/2014 | Takahashi | ........... | B29C 45/1675 |
| | | | | 425/130 |
| 2015/0044960 A1 * | 2/2015 | Hara | ......................... | F24F 7/04 |
| | | | | 264/263 |
| 2015/0131231 A1 * | 5/2015 | Yoo | ...................... | H05K 3/4007 |
| | | | | 29/841 |
| 2015/0253524 A1 * | 9/2015 | Ito | ........................ | G02B 6/4278 |
| | | | | 385/92 |
| 2020/0282611 A1 * | 9/2020 | Hirasawa | ........... | B29C 45/14065 |
| 2023/0112605 A1 * | 4/2023 | Brugger | .............. | A61M 1/3639 |
| | | | | 210/321.71 |

OTHER PUBLICATIONS

English Translation of Chinese Office Action dated Sep. 22, 2022 for the related Chinese Patent Application No. 201980085724.1.

* cited by examiner

MOLD, MANUFACTURING DEVICE, AND MANUFACTURING METHOD FOR MANUFACTURING MOLDED BODY

RELATED APPLICATIONS

This application is a continuation of the PCT International Application No. PCT/JP2019/050459 filed on Dec. 24, 2019, which claims the benefit of foreign priority of Japanese patent application No. 2018-246630 filed on Dec. 28, 2018, the contents all of which are incorporated herein by reference.

BACKGROUND

1. Technical Field

The present disclosure relates to a mold, a manufacturing device, and a manufacturing method for manufacturing a molded body

2. Description of the Related Art

In recent years, with the miniaturization and weight reduction of electronic devices, a small-sized and large-capacitance capacitor for high-frequency has been demanded. As such a capacitor, an electrolytic capacitor having a small equivalent series resistance (ESR) and excellent frequency characteristics has been developed. As an anode body of an electrolytic capacitor, for example, a porous sintered body obtained by sintering valve metal particles such as tantalum, niobium, and titanium is used.

The porous sintered body is usually produced by putting valve metal particles into a space partially defined by a mold, pressure-molding the particles, and then sintering the particles. The valve metal particles are usually put through an opening provided above the above-mentioned space. After the valve metal particles are put, the opening is closed by a mold holding an anode wire, and pressure-molding is performed. As a result, a molded body in which the anode wire is planted from an upper surface can be obtained. Since density of the valve metal particles in a region close to the surface from which the anode wire is planted tends to be sparse, the anode wire may not be sufficiently fixed in the molded body after pressure molding.

Thus, Unexamined Japanese Patent Publication No. 10-163074 proposes a method for increasing the density of the valve metal particles in the region close to the surface from which the anode wire is planted.

SUMMARY

A mold according to a first aspect of the present disclosure defines a molding space substantially having a rectangular parallelepiped shape. The rectangular parallelepiped shape has a first surface, a second surface opposed to the first surface, a third surface and a fourth surface that are opposed to each other and intersect the first surface and the second surface, and a fifth surface and a sixth surface that are opposed to each other and intersect the first surface, the second surface, the third surface, and the fourth surface. The mold includes a pair of first mold parts each defining a corresponding one of the first surface or the second surface, a pair of second mold parts each defining a corresponding one of the third surface or the fourth surface, and a pair of third mold parts each defining a corresponding one of the fifth surface or the sixth surface. At least one of the pair of third mold parts includes an upper mold part and a lower mold part. The upper mold part defines an upper part of the corresponding one of the fifth surface or the sixth surface. The lower mold part defines a lower part of the corresponding one of the fifth surface or the sixth surface. The upper mold part and the lower mold part are individually slidable. The upper part is closer to the first surface than the lower part is, and the lower part is closer to the second surface than the upper part is. The lower mold part is configured to protrude toward the molding space with respect to the upper mold part so that a step portion due to a difference between a location of the upper mold part and a location of the lower mold part is formed. The upper mold part is configured to be slidable relative to the lower mold part to make a size of the step portion decrease. The upper mold part and the lower mold part are configured to be integrally slidable in a state that the step portion remains or is absent.

A device for manufacturing a molded body according to a second aspect of the present disclosure includes the mold according to the first aspect described above and a hopper that puts metal particles into a space partially defined by the mold.

A method for manufacturing a molded body according to a third aspect of the present disclosure is a method for manufacturing a molded body by the mold according to the first aspect described above, and includes the following first to third steps. In the first step, an initial space larger than the molding space is partially defined by one of the pair of first mold parts, the pair of second mold parts, and the pair of third mold parts. In the second step, metal particles are put into the initial space. In the third step, the metal particles are pressed by advancing at least one of the pair of third mold parts in the initial space. In the first step, a step portion due to a difference between a location of the upper mold part and a location of the lower mold part is formed. The third step includes a step of integrally advancing the upper mold part and the lower mold part while the step portion remains, a step of advancing the upper mold part relative to the lower mold part to make a size of the step portion decrease while advancing the third mold part, and a step of integrally advancing the upper mold part and the lower mold part while the step portion is absent.

A method for manufacturing a porous sintered body according to a fourth aspect of the present disclosure includes a step of baking a molded body obtained by the method for manufacturing a molded body according to the third aspect described above.

An electrolytic capacitor according to a fifth aspect of the present disclosure includes a capacitor element. The capacitor element includes a porous sintered body, an anode wire, a dielectric layer disposed on the porous sintered body, a solid electrolyte layer disposed on the dielectric layer, and a cathode layer disposed on the solid electrolyte layer. The porous sintered body includes a first surface, a second surface opposed to the first surface, a third surface and a fourth surface that are opposed to each other and intersect the first surface and the second surface, and a fifth surface and a sixth surface that are opposed to each other and intersect the first surface, the second surface, the third surface, and the fourth surface. The anode wire includes a first part embedded in the porous sintered body and a second part other than the first part, and the second part extends from the first surface. At least one of the fifth surface and the sixth surface includes a boundary line extending in a direction intersecting a longitudinal direction of the anode wire. The boundary line derived from a boundary between an upper mold part and a lower mold part. The upper mold part defines an upper part of the corresponding one of the fifth surface or the sixth surface. The lower mold part defines a lower part of the corresponding one of the fifth surface or the sixth surface. The upper mold part and the lower mold part are individually slidable. The upper part is closer to the first surface than the lower part is, and the lower part is closer to the second surface than the upper part is. The porous sintered body satisfies a relationship of La≤Lb, where La represents a shortest length in the longitudinal direction from the boundary line to the first surface, and Lb represents a shortest length in the longitudinal direction from the boundary line to the second surface, when viewed from a normal direction of the fifth surface or the sixth surface.

An electrolytic capacitor according to a sixth aspect of the present disclosure includes a capacitor element. The capacitor element includes a porous sintered body, an anode wire, a dielectric layer disposed on the porous sintered body, a solid electrolyte layer disposed on the dielectric layer, and a cathode layer disposed on the solid electrolyte layer. The porous sintered body includes a first surface, a second surface opposed to the first surface, a third surface and a fourth surface that are opposed to each other and intersect the first surface and the second surface, and a fifth surface and a sixth surface that are opposed to each other and intersect the first surface, the second surface, the third surface, and the fourth surface. The anode wire includes a first part embedded in the porous sintered body and a second part other than the first part, and the second part extends from the first surface. At least one of the fifth surface and the sixth surface includes a boundary line extending in a direction intersecting a longitudinal direction of the anode wire. The boundary line derived from a boundary between an upper mold part and a lower mold part. The upper mold part defines an upper part of the corresponding one of the fifth surface or the sixth surface. The lower mold part defines a lower part of the corresponding one of the fifth surface or the sixth surface. The upper mold part and the lower mold part are individually slidable. The upper part is closer to the first surface than the lower part is, and the lower part is closer to the second surface than the upper part is. An end of the first part of the anode wire is positioned within a region from the boundary line to the second surface of the porous sintered body when viewed from a normal direction of the fifth surface or the sixth surface.

According to the present disclosure, a molded body having a small density difference of metal particles can be obtained.

DETAILED DESCRIPTION OF EMBODIMENT

Figure 1A:
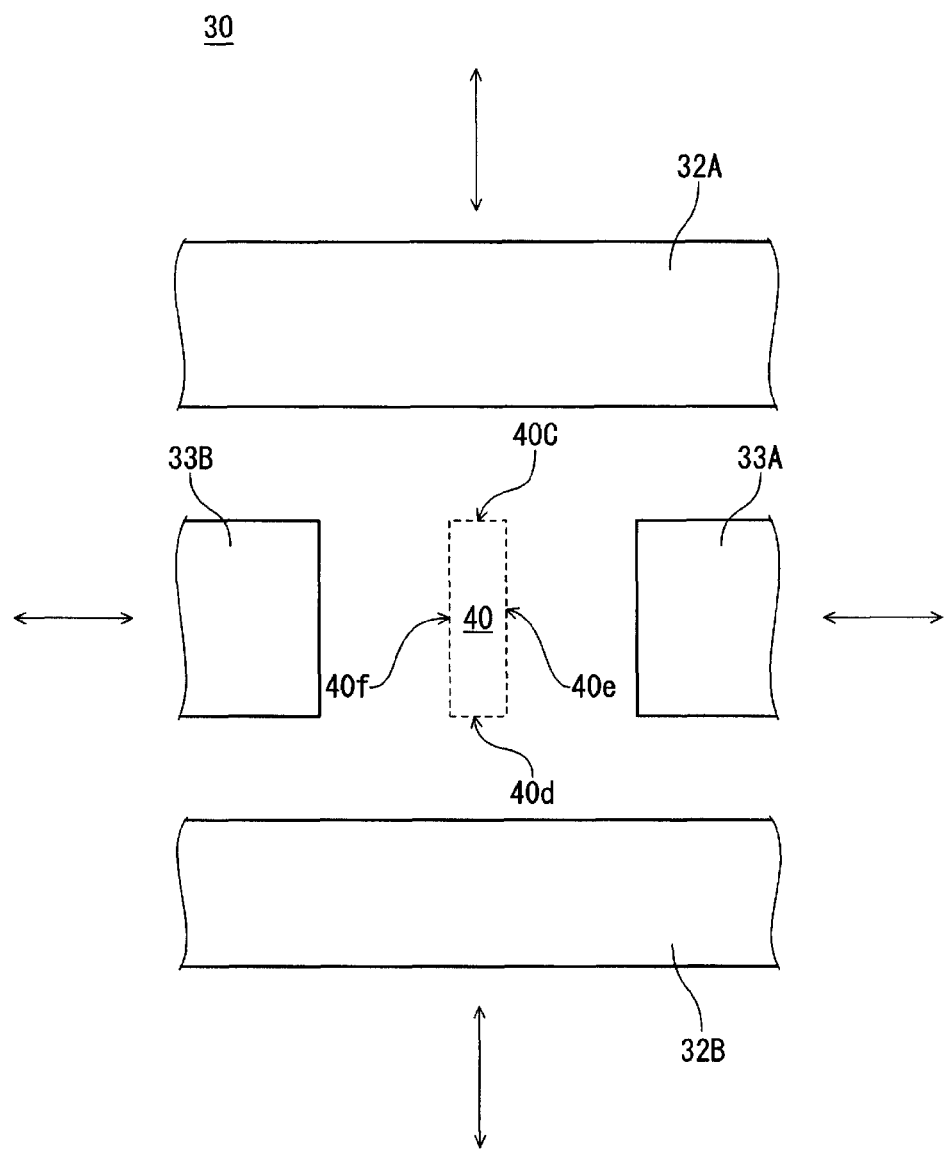
FIG. 1A is a developed schematic view illustrating a mold according to an exemplary embodiment of the present disclosure as viewed from above.

In the method described in Unexamined Japanese Patent Publication No. 10-163074, the density of the valve metal particles on the above-mentioned surface side of the molded body may become excessively high. If the density of the valve metal particles becomes too high, the particles are excessively bonded to each other, and thus the surface area of the molded body is reduced. In this case, the capacitance of the electrolytic capacitor is reduced. In addition, the density of the molded body in a region close to the above-mentioned surface may be largely different from that in a region close to a surface opposite to the above-mentioned surface. Due to this, cracks are likely to occur near the interface between the sparse region and the dense region of the molded body (or sintered body), and thus leakage current may increase when the molded body is used as an electrolytic capacitor.

In the present exemplary embodiment, the density difference of the metal particles is reduced by providing a sufficient space for the metal particles to move when pressure molding is started. Specifically, among mold parts according to the present exemplary embodiment, a third mold part defining a fifth surface or a sixth surface intersecting a first surface on which an anode wire is planted is divided into an upper mold part and a lower mold part that are slidable independently. Then, by causing the lower mold part to protrude toward a molding space with respect to the upper mold part, a step portion due to a difference between a location of the upper mold part and a location of the lower mold part is formed in the molding space. As a result, in an initial space when pressure molding is started, an upper space is formed by a first mold part defining the first surface, a pair of second mold parts, and the upper mold part, while a lower space is formed by the first mold part defining a second surface, the pair of second mold parts, and the lower mold part.

A width of the upper space is larger than a width of the lower space in sliding direction A of the third mold part (a direction in which a pair of the third mold parts approach and separate from each other). When both of the upper mold part and the lower mold part of the third mold part in this state are moved such that the pair of third mold parts approach each other, metal particles put in the initial space can be easily moved from the lower space to the upper space. Thus, it is suppressed that the density of the metal particles in the lower space becomes excessively high. And a number of metal particles in the upper space increases. After that, by further moving only the upper mold part of the third mold part, the density of the metal particles in the upper space increases. That is, the density difference of the metal particles between the upper space and the lower space becomes small.

<Mold>

A mold according to the present exemplary embodiment is used for molding a molded body in which an anode wire is planted. The molded body substantially has a rectangular parallelepiped shape, and an anode wire is planted from one surface of the molded body.

The molded body includes a first surface through which the anode wire can be planted, a second surface opposed to the first surface, a third surface and a fourth surface that are opposed to each other and intersect the first surface and the second surface, a fifth surface and a sixth surface that are opposed to each other and intersect the first surface, the second surface, the third surface, and the fourth surface. Area of each of the third surface and the fourth surface may be smaller than area of each of the fifth surface and the sixth surface.

The mold defines a molding space substantially having a rectangular parallelepiped shape corresponding to the molded body. The molding space also includes a first surface, a second surface opposed to the first surface, a third surface and a fourth surface that are opposed to each other and intersect the first surface and the second surface, a fifth surface and a sixth surface that are opposed to each other and intersect the first surface, the second surface, the third surface, and the fourth surface.

The mold includes a pair of first mold parts, a pair of second mold parts, and a pair of third mold parts.

The pair of first mold parts defines the first surface and the second surface of the molding space. One of the pair of first mold parts may hold the anode wire. The pair of first mold parts is arranged so as to face each other and is slidable in a longitudinal direction of the anode wire.

The pair of second mold parts define the third surface and the fourth surface of the molding space. The pair of second mold parts is arranged so as to face each other and is slidable in a direction approaching to each other and a direction separating from each other.

The pair of third mold parts define the fifth surface and the sixth surface of the molding space. The pair of third mold parts is arranged so as to face each other and is slidable in a direction approaching to each other and a direction separating from each other (hereinafter, may be collectively referred to as sliding direction A). It is referred to as "advancing" of the third mold part that the third mold part slides so as to reduce a space between the pair of third mold parts. And it is referred to as "retracing" of the third mold part that the third mold part slides so as to increases the space between the pair of third mold parts.

At least one of the pair of third mold parts includes an upper mold part and a lower mold part. The upper mold part defines an upper part, which is close to the first surface, of a corresponding one of the fifth surface or the sixth surface. And the lower mold part defines a lower part, which is close to the second surface, of the corresponding one of the fifth surface or the sixth surface. The upper mold part and the lower mold part are slidable independently. At an initial position when pressure molding is started, the lower mold part protrudes toward the molding space with respect to the upper mold part. Hence, at stating of the pressure molding, a step portion due to a difference between a location of the upper mold part and a location of the lower mold part is formed in the third mold part. And thus the initial space has the lower space defined by the lower mold part and the upper space defined by the upper mold part, where a width of the upper space in sliding direction A is larger than that of the lower space. At the starting of pressure molding, at least a part of the lower space is filled with metal particles. A part of the upper space may also be occupied by the metal particles. As the pair of third mold parts approaches to each other, the metal particles filling the lower space move from the lower space, which is narrowing, to the upper space having a large space not filled with the metal particles. Since the width of the upper space in sliding direction A is larger than the width of the lower space in sliding direction A, the metal particles easily move to the upper space.

A length of the step portion in sliding direction A (width Wa: protruding length of the lower mold part with respect to the upper mold part) is not particularly limited, but is, for example, 2% or more of the length (width W40) of the molding space in sliding direction A. When a ratio of width Wa to width W40 is in this range, the density in the region close to the first surface of the molded body tends to be high. The ratio of width Wa to width W40 may be 3% or more. It is preferable that width Wa of the step portion is not excessively large in a view of making the density difference of the metal particles between the upper space and the lower space become small. Width Wa of the step portion is, for example, 15% or less of width W40 of the molding space. When the ratio of width Wa to width W40 is in this range, excessive movement of the metal particles to the upper space is suppressed, and the density in the region close to first surface and the density in the region close to the second surface tend to be uniform in the molded body obtained. The ratio of width Wa to width W40 may be 10% or less, and may be 8% or less. Width W40 of the molding space is the same as distance W between the fifth surface and the sixth surface of the molded body.

In a direction perpendicular to sliding direction A, a ratio of a length of the upper mold part to a length of the lower mold part is not particularly limited. The ratio (Ha:Hb) of the length (height Ha) of the upper mold part in the direction perpendicular to sliding direction A to the length (height Hb) of the lower mold part in the direction perpendicular to sliding direction A may range, for example, from 4:1 to 1:4, or from 2:3 to 1:3. It is preferable that height Hb is height Ha or more in a view of making the density difference of the metal particles between the upper space and the lower space become small. The ratio (Ha:Hb) may range, for example, from 1:1 to 1:4, or from 1:1 to 1:3.

Minimum initial interval W0 in sliding direction A between the pair of third mold parts is not particularly limited as long as initial interval W0 is larger than width W40 of the molding space. Initial interval W0 may be, for example, greater than 100% of width W40 of the molding space, and 300% or more of width W40 of the molding space, and may be 500% or more of width W40 of the molding space. Initial interval W0 may be 1000% or less of width W40 of the molding space, and may be 800% or less of width W40 of the molding space. When the pair of third mold parts each includes the upper mold part and the lower mold part, it can be said that initial interval W0 is initial interval W0 between the lower mold parts.

After pressure molding is started, firstly, each of the upper mold part and the lower mold part advance integrally while the step portion remains. Next, the upper mold part advances relative to the lower mold part, a size (a length in sliding direction A) of the step portion decreases, and eventually the step portion disappears. After that, the upper mold part and the lower mold part advance integrally to predetermined positions while the step portion is absent.

Figure 1B:
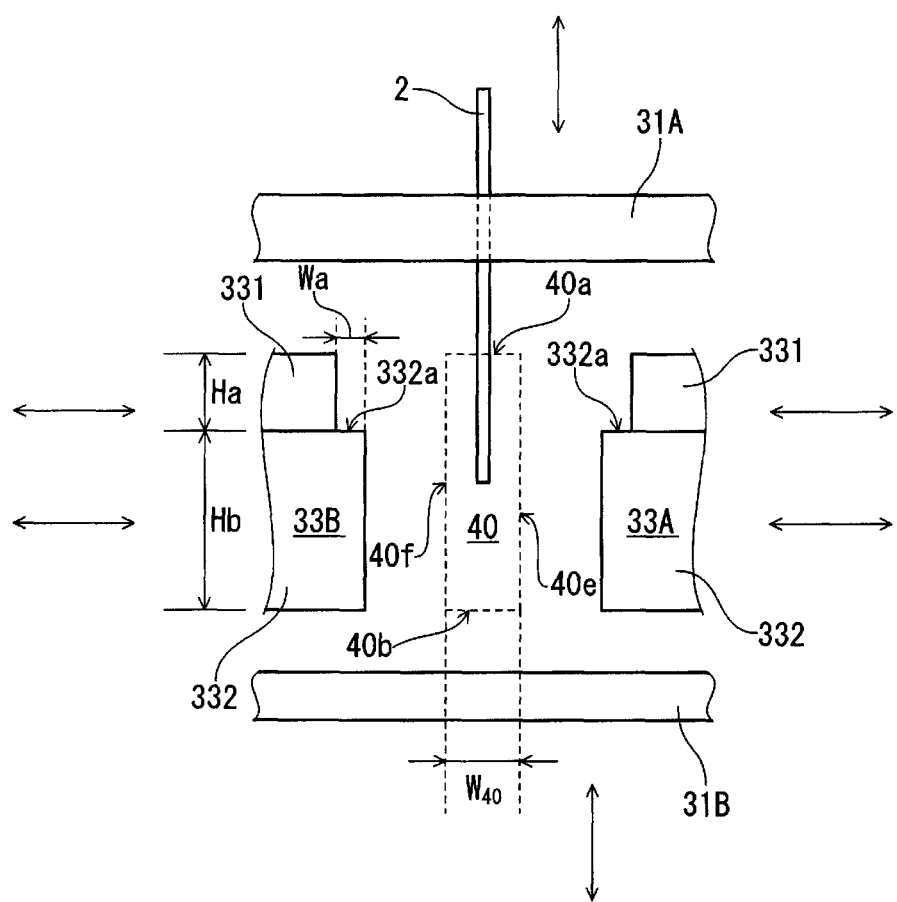
FIG. 1B is a developed schematic view illustrating the mold according to the exemplary embodiment of the present disclosure as viewed from a side.

FIG. 1A is a developed schematic view illustrating a mold according to the present exemplary embodiment as viewed from above. In FIG. 1A, the first mold parts are omitted for convenience. FIG. 1B is a developed schematic view illustrating the mold according to the present exemplary embodiment as viewed from a side. In FIG. 1B, the second mold parts are omitted for convenience. Further, in FIG. 1B, each of the pair of third mold parts is divided into an upper mold part and a lower mold part, but the configuration is not limited to this. One of the pair of third mold parts may include the upper mold part and the lower mold part. Further, the third mold part may further include another mold part next to the upper mold part at a side opposite to the lower mold part.

Mold 30 includes a pair of first mold parts (31A and 31B) that defines first surface 40a and second surface 40b of molding space 40, a pair of second mold parts (32A and 32B) that defines third surface 40c and fourth surface 40d of molding space 40, and a pair of third mold parts (33A and 33B) that defines fifth surface 40e and sixth surface 40f of molding space 40.

The pair of first mold parts 31A and 31B is arranged so as to face each other and is slidable in a longitudinal direction of anode wire 2. The pair of second mold parts 32A and 32B is arranged so as to face each other and is slidable in a direction approaching to each other and a direction separating from each other. The pair of third mold parts 33A and 33B is also arranged so as to face each other and is slidable in a direction approaching to each other and a direction separating from each other.

Third mold parts 33A and 33B each include upper mold part 331 and lower mold part 332. Upper mold part 331 and lower mold part 332 are slidable independently. At initial positions when pressure molding is started, third mold parts 33A and 33B each have step portion 332a due to a difference between a location of upper mold part 331 and a location of lower mold part 332. Upper mold part 331 and lower mold part 332 can advance integrally while step portion 332a remains. Upper mold part 331 can advance relative to lower mold part 332 so as to make a size of step portion 332a decrease. Upper mold part 331 and lower mold part 332 can advance integrally even while step portion 332a is absent.

<Manufacturing Device of Molded Body>

A device for manufacturing a molded body according to the present exemplary embodiment includes the above-mentioned mold and a hopper (not shown) that puts metal particles into a space partially defined by the mold. The hopper puts a predetermined mass of metal particles into the initial space larger than the molding space. The initial space is defined by, for example, one of the first mold parts that does not hold the anode wire, the pair of second mold parts, and the pair of third mold parts.

<Manufacturing Method of Molded Body>

The molded body according to the present exemplary embodiment is manufactured by a method including a first step (S1) of partially defining the initial space larger than the molding space by one of the pair of first mold parts, the pair of second mold parts, and the pair of third mold parts, a second step (S2) of putting metal particles into the partially defined initial space, and a third step (S3) of pressing the metal particles by advancing the third mold parts in the defined initial space.

Figure 2:
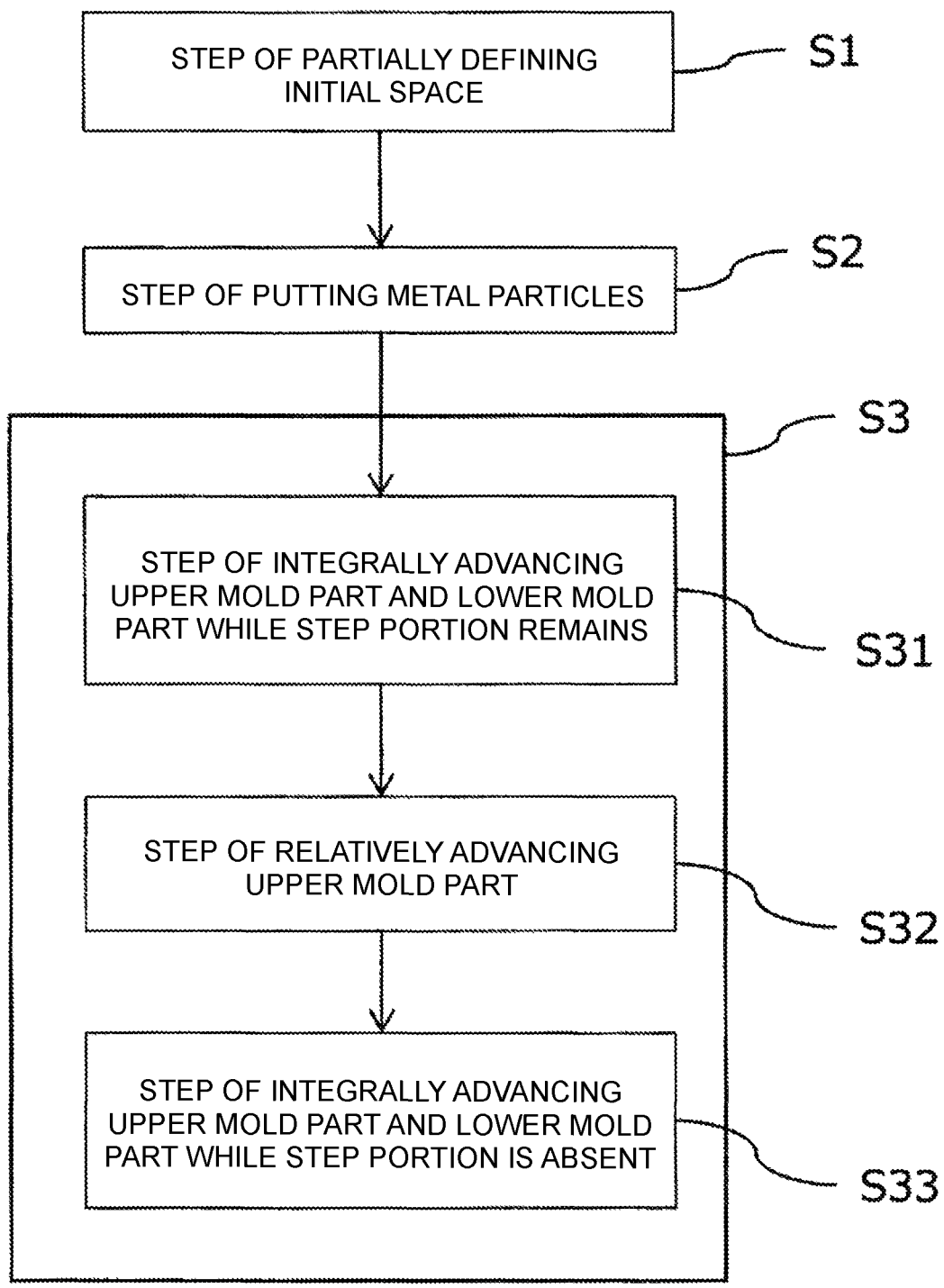
FIG. 2 is a flowchart showing a manufacturing method according to the exemplary embodiment of the present disclosure.

FIG. 2 is a flowchart showing the manufacturing method according to the present exemplary embodiment.

(1) First Step

The initial space larger than the molding space is partially defined by one of the first mold parts that does not hold the anode wire, the pair of second mold parts, and the pair of third mold parts.

Arrangement of the pair of third mold parts is provisional. In the steps after the second step, the third mold parts are further slid. Arrangement of the first mold parts and the second mold parts may also be provisional. For example, in the steps after the second step, the first mold parts and the second mold parts may also be further slid.

Figure 3:
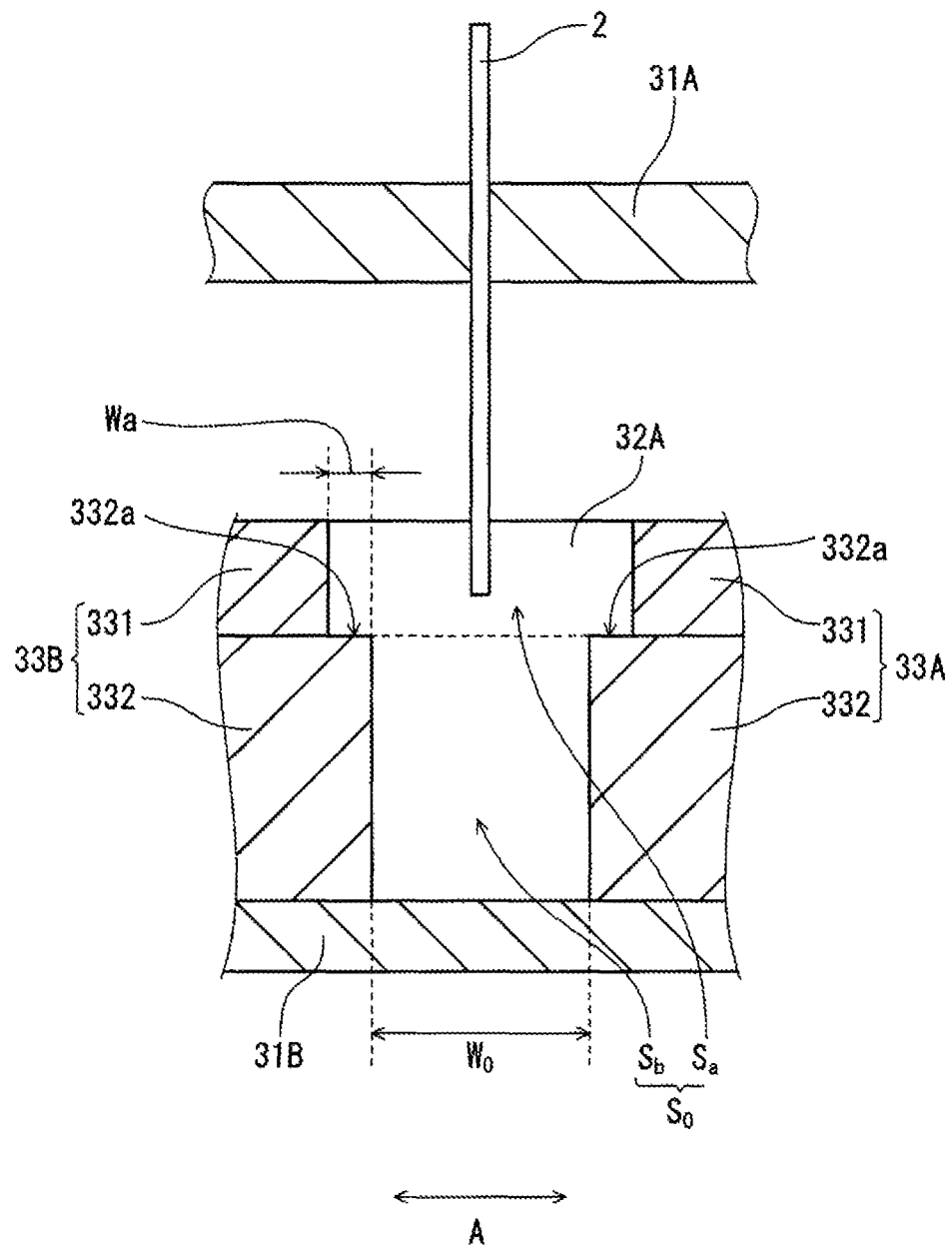
FIG. 3 is a cross-sectional view schematically showing arrangement of the mold in a first step of the manufacturing method according to the exemplary embodiment of the present disclosure.

FIG. 3 is a cross-sectional view schematically showing arrangement of the mold in the first step. In FIG. 3, for convenience, one of the pair of second mold parts is omitted. Further, in FIG. 3, each of the pair of third mold parts is divided into an upper mold part and a lower mold part, but the configuration is not limited to this.

Lower mold part 332 protrudes toward initial space S0 with respect to upper mold part 331, and step portion 332a due to a difference between a location of upper mold part 331 and a location of lower mold part 332 is formed. Width Wa of step portion 332a ranges from 3% to 8%, inclusive, of width W40 of the molding space (see FIG. 1B). The ratio (Ha:Hb) of height Ha of the upper mold part to height Hb of the lower mold part is 1:2. Minimum initial interval W0 between third mold part 33A and third mold part 33B in sliding direction A ranges, for example, from 500% to 800%, inclusive, of width W40 of the molding space.

First mold part 31B that does not hold anode wire 2, the pair of second mold parts 32A and 32B, and the pair of third mold parts 33A and 33B partially define initial space S0 larger than molding space 40. Initial space S0 includes upper space Sa formed by first mold part 31A defining first surface 40a, the pair of second mold parts 32A and 32B, and upper mold parts 331, and lower space Sb formed by first mold part 31B defining second surface 40b, a pair of second mold parts 32A and 32B, and lower mold parts 332. The width of upper space Sa in sliding direction A is larger than the width of lower space Sb in sliding direction A by about twice width Wa of step portion 332a.

(2) Second Step

A predetermined mass of metal particles is put into the partially defined initial space.

The initial space is large enough for the metal particles to be put. Hence, even after the metal particles are put, at least a part of the upper space is not filled with the metal particles.

Figure 4:
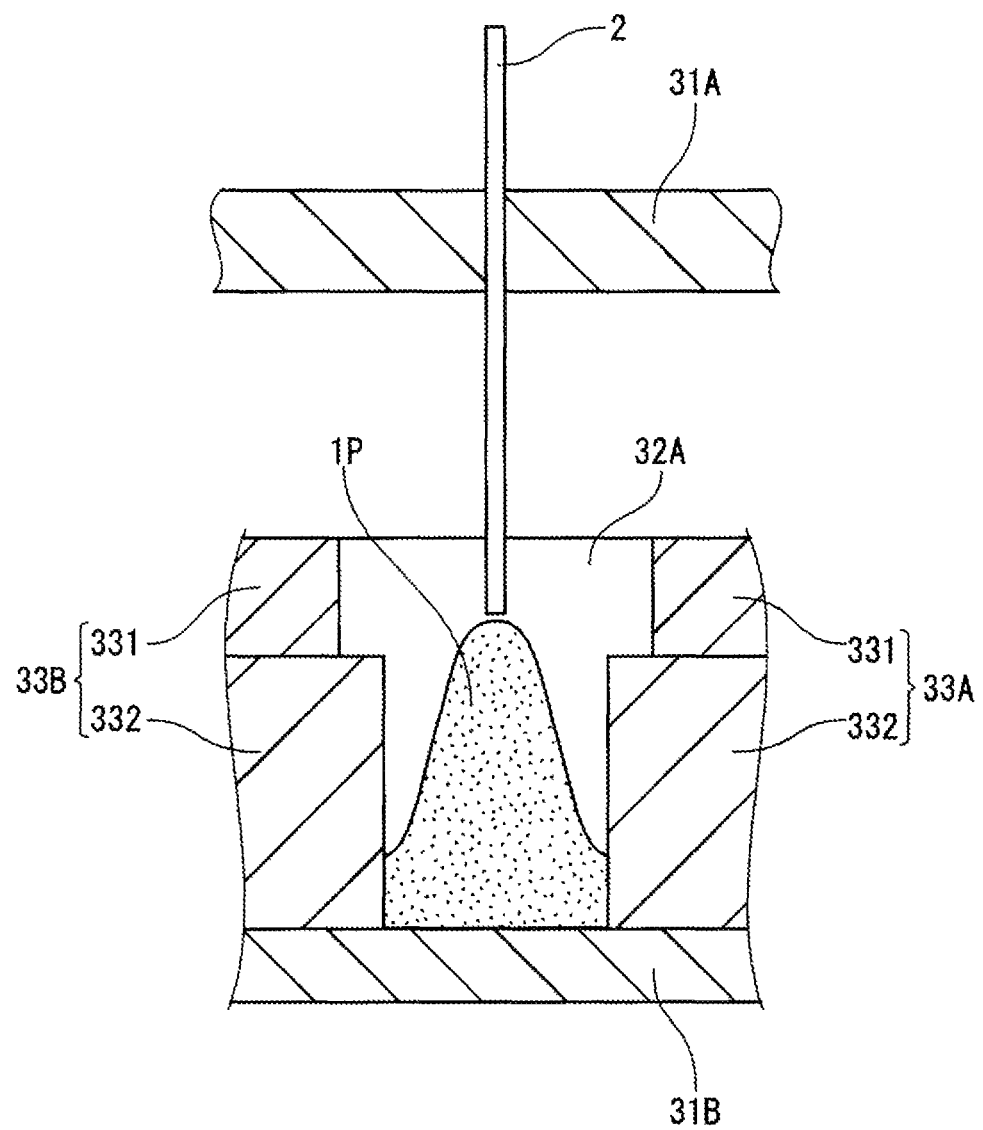
FIG. 4 is a cross-sectional view schematically showing arrangement of the mold in a second step of the manufacturing method according to the exemplary embodiment of the present disclosure.

FIG. 4 is a cross-sectional view schematically showing arrangement of the mold in the second step. In FIG. 4, for convenience, one of the pair of second mold parts is omitted. Metal particles 1P put into initial space S0 spread out in a cone shape as shown, for example. Thus, a part of the upper space and the lower space remains without being filled with metal particles 1P.

(3) Third Step

For example, the other one of the pair of first mold parts (first mold part 31A holding anode wire 2) is slid to a predetermined position to define the initial space. The third mold parts advance in the defined initial space. As a result, the metal particles are pressurized to form a molded body.

Before sliding the third mold parts, the second mold parts may be further slid to predetermined positions. The pair of third mold parts may be slid at the same time, or one of the third mold parts may be fixed and only the other one of the third mold parts may be slid.

The third step includes a step of integrally advancing the upper mold part and the lower mold part while the step portion remains (S31), a step of advancing the upper mold part relative to the lower mold part so as to make a size of the step portion decrease (S32), and a step of integrally advancing the upper mold part and the lower mold part while the step portion is absent (S33).

The upper space is wider than the lower space in sliding direction A. As described above, when the upper and lower mold parts advance integrally while the step portion remains, the metal particles put in initial space S0 can easily move from the lower space to the upper space. Hence, it is suppressed that the density of the metal particles in the lower space becomes excessively high. And the number of metal particles in the upper space increases. After that, by further moving only the upper mold part of the third mold part, the density of the metal particles in the upper space is increased. That is, the density difference between the upper space and the lower space becomes small.

When the interval between the pair of third mold parts is narrowed to some extent, the density of the metal particles put into the lower space increases, and force is generated to push the lower mold part in a retracting direction. On the other hand, it is difficult to apply the pushing force in the retracting direction to the upper mold parts arranged wider than the interval between the lower mold parts. Thus, each of the upper mold parts advances relative to each of the lower mold parts, and a size of the step portion decreases. When there is no step and a surface of the upper mold part facing the upper space and a surface of the lower mold part facing the lower space are flush with each other, the relative advancing of the upper mold part stops, and the upper mold part and the lower mold part advance integrally while the step portion is absent.

FIG. 5A to 5E are schematic cross-sectional views showing an operation of the third mold part in the third step. In FIGS. 5A to 5E, the second mold parts are omitted for convenience.

Figure 5A:
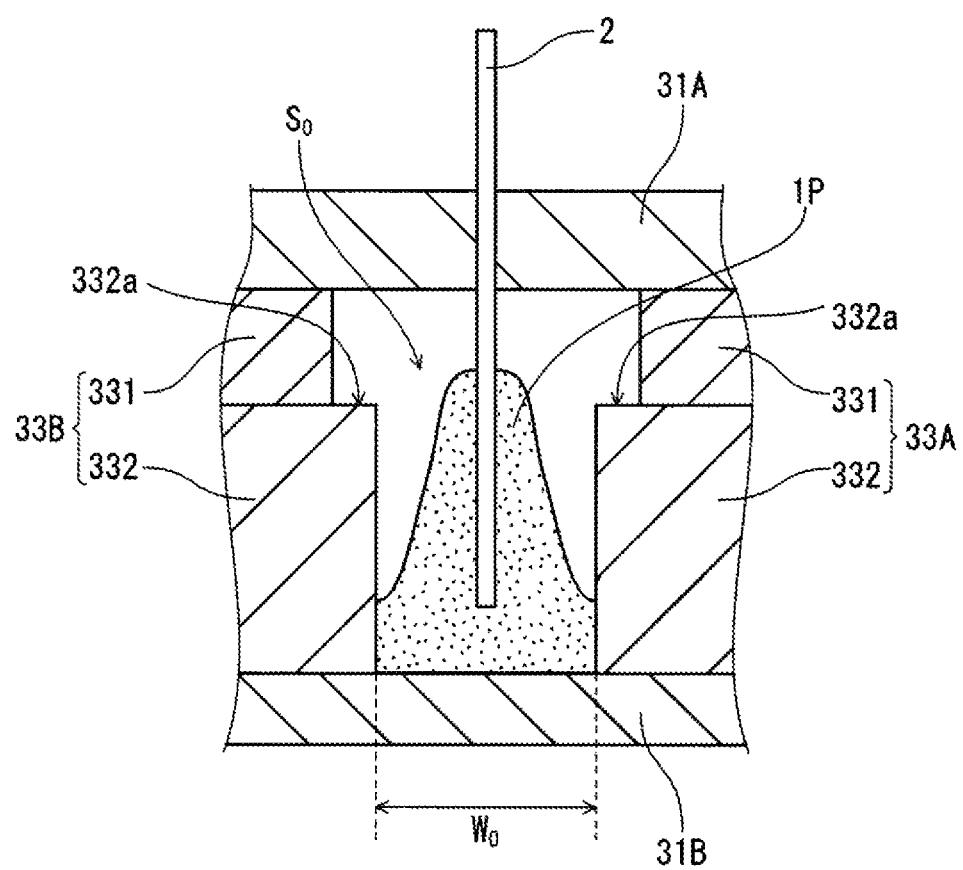
FIG. 5A is a cross-sectional view schematically showing initial arrangement of a third mold part in a third step of the manufacturing method according to the exemplary embodiment of the present disclosure.

FIG. 5A is a cross-sectional view schematically showing initial arrangement of the third mold parts.

In FIG. 5A, first mold parts 31A and 31B are slid to predetermined positions before third mold parts 33A and 33B are slid to define entire initial space S0. Further, second mold parts 32A and 32B are slid to predetermined positions defining a part of molding space 40. As a result, a part of molding space 40 is also defined. After that, the first mold parts and the second mold parts do not have to be slid. The minimum initial interval between third mold part 33A and third mold part 33B in sliding direction A is W0.

Figure 5B:
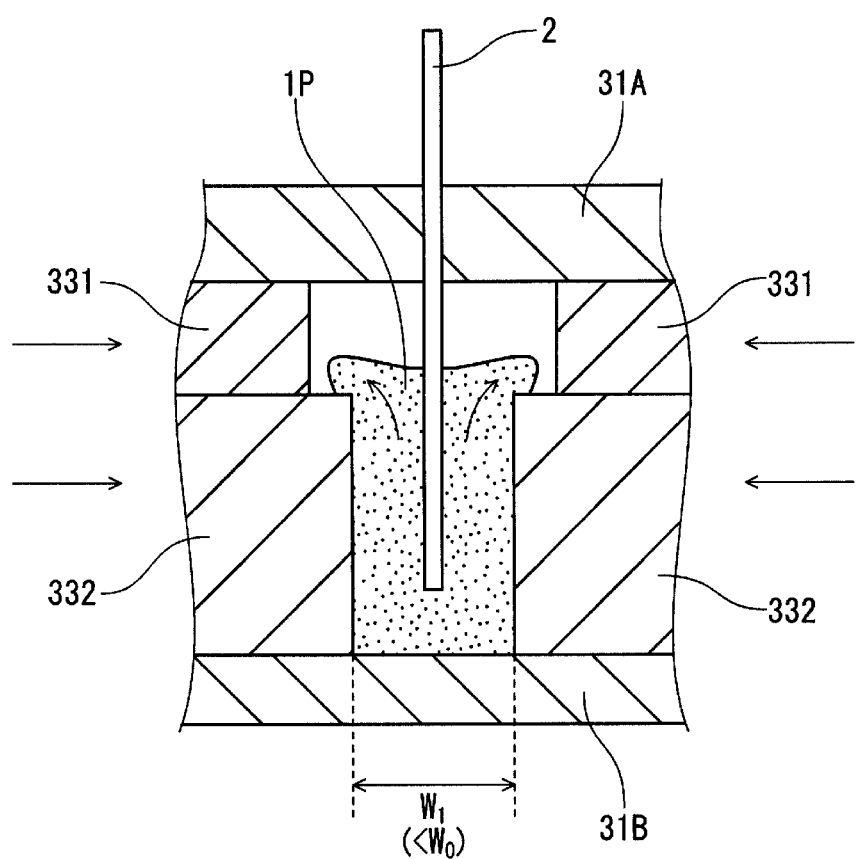
FIG. 5B is a cross-sectional view schematically showing how an upper mold part and a lower mold part advance integrally while a step portion remains in the third step of the manufacturing method according to the exemplary embodiment of the present disclosure.

FIG. 5B is a cross-sectional view schematically showing how the upper mold part and the lower mold part advance integrally while the step portion remains.

Minimum first interval W1 in sliding direction A between the third mold parts is smaller than initial interval W0. The upper mold part and the lower mold part advance integrally, and both the upper space and the lower space are narrowed. Meanwhile, since metal particles 1P can escape to the upper space that is wider in sliding direction A, the density of the metal particles in the lower space does not increase excessively. On the other hand, the number of metal particles in the upper space increases.

Figure 5C:
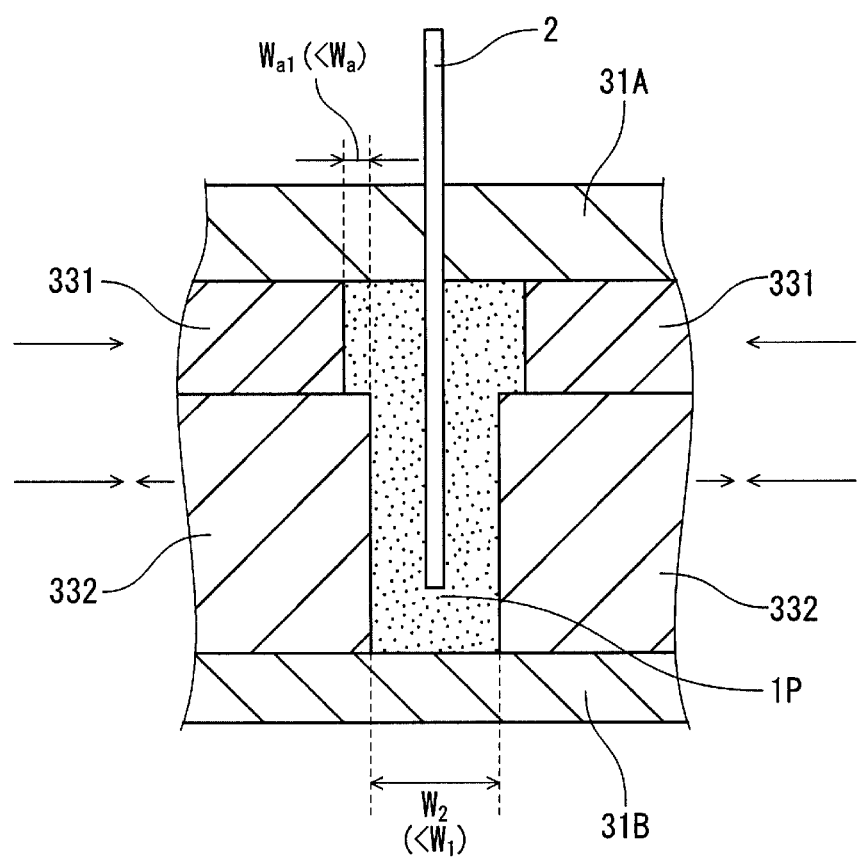
FIG. 5C is a cross-sectional view schematically showing how the upper mold part relatively advances in the third step of the manufacturing method according to the exemplary embodiment of the present disclosure.

FIG. 5C is a cross-sectional view schematically showing how the upper mold part advance relatively.

When second interval W2 in sliding direction A between lower mold parts 332 is further narrower than first interval W1, both the upper space and the lower space are filled with the metal particles. Then, the density of metal particles 1P in the lower space, which is a narrower space, becomes high more quickly than the upper space, and lower mold parts 332 are pushed in the retracting direction. Hence, width Wa1 of step portion 332a is smaller than initial width Wa. Meanwhile, the entire third mold parts are sliding in an advancing direction.

Figure 5D:
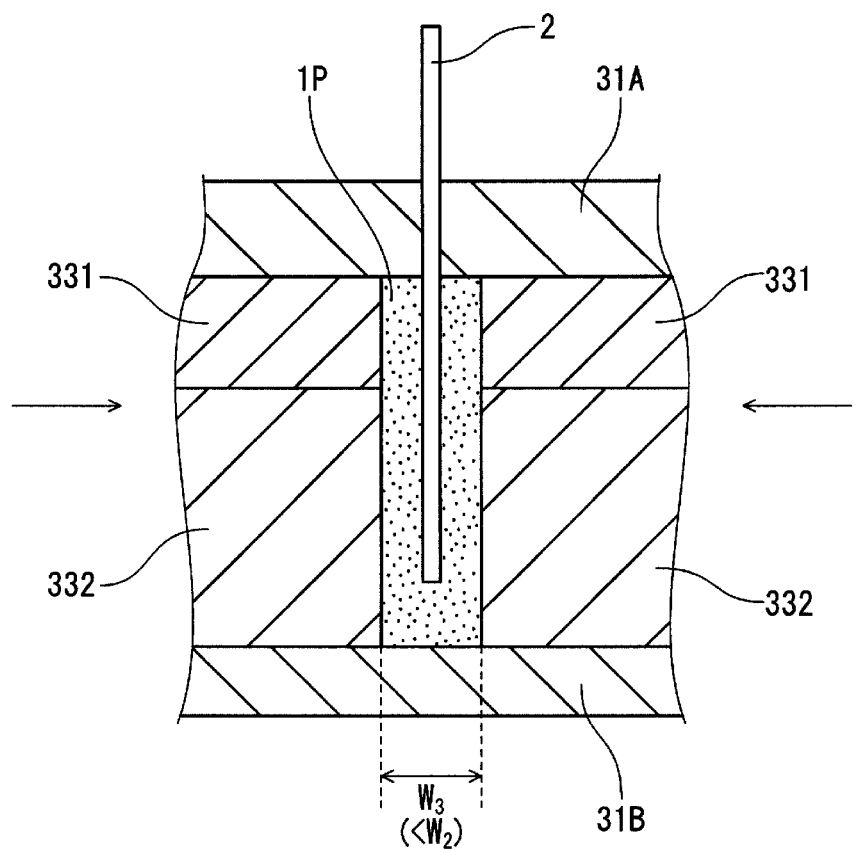
FIG. 5D is a cross-sectional view schematically showing how a surface of the upper mold part and a surface of the lower mold part are flush with each other in the third step of the manufacturing method according to the exemplary embodiment of the present disclosure.

FIG. 5D is a cross-sectional view schematically showing how a surface of each of the upper mold parts facing the upper space and a surface of each of the lower mold parts facing the lower space are flush with each other.

Width Wa of step portion 332a gradually decreases, and finally step portion 332a disappears (Wa=0). Then, the relative advancing of each of upper mold parts 331 stops, and upper mold part 331 and lower mold part 332 advance integrally. When the relative advancing of upper mold part 331 stops, third interval W3 between the third mold parts is smaller than second interval W2.

Figure 5E:
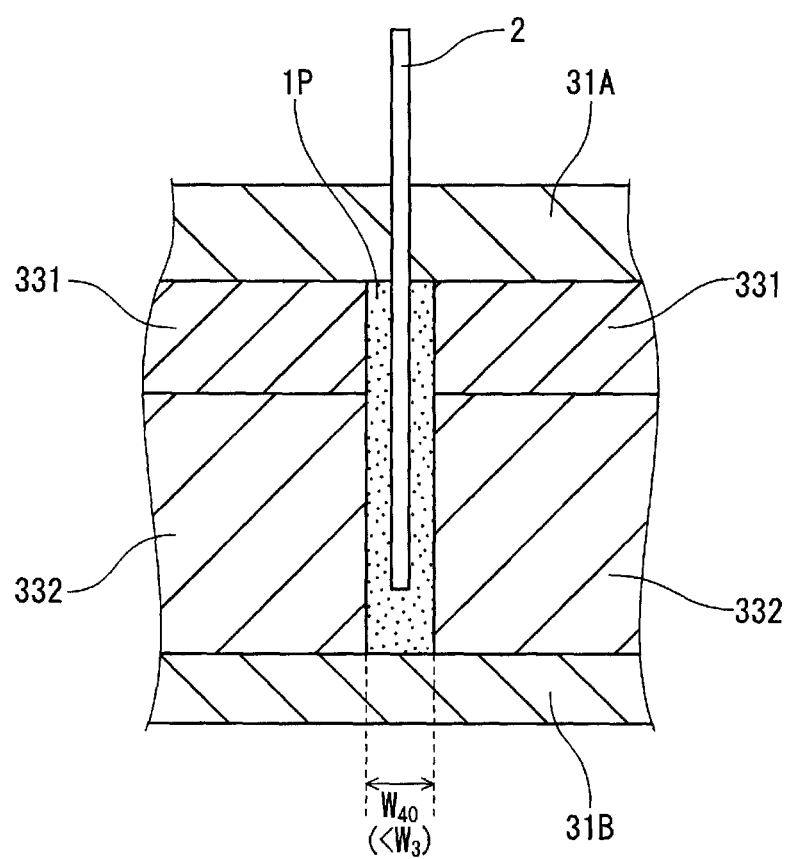
FIG. 5E is a cross-sectional view schematically showing how the upper mold part and the lower mold part are arranged at predetermined positions defining a molding space in the third step of the manufacturing method according to the exemplary embodiment of the present disclosure.

FIG. 5E is a cross-sectional view schematically showing how the upper mold part and the lower mold part are arranged at predetermined positions defining the molding space.

Upper mold part 331 and lower mold part 332 further advance integrally to predetermined positions. The predetermined positions are positions where the interval between the third mold parts becomes width W40 of the molding space. Until the interval between the third mold parts becomes from W3 to W40, upper mold part 331 and lower mold part 332 advance integrally and compress the metal particles.

After the step portion due to a difference between a location of the upper mold part and a location of the lower mold part disappears, the upper mold part and the lower mold part advance integrally to compress the metal particles, thereby eliminating a pressure difference between the upper space and the lower space. Further, since the metal particles in the upper space and the lower space, which have not been compressed, are compressed at the same timing, a boundary between the metal particles in the upper space and the metal particles in the lower space is less likely to be generated. Thus, when the molded body of the present exemplary embodiment is used for an electrolytic capacitor, leakage current is likely to be suppressed.

The operation of the upper mold part and the lower mold part in the third step can be achieved by an operating unit provided with the following mechanism.

The operating unit of the third mold part includes a rod-shaped member (hereinafter, referred to as a pin) extending in sliding direction A of the third mold part, a ring-shaped spacer, an urging member, and a base.

One end (first end) of the pin is in contact with a part of the lower mold part at a side opposite to the molding space. Another end (second end) of the pin faces the base. The pin has a flange located in a middle of the pin. The spacer is disposed on the flange at a side close to the second end of the pin. Thickness of the spacer determines width Wa of the step portion. The urging member is disposed between the base and the spacer, and is in contact with the base and the spacer. The urging member is, for example, an elastic body such as a spring.

When the urging member is in a no-load state, the second end of the pin is not in contact with the base, and a gap having a same width as the thickness of the spacer is formed between the base and the second end of the pin. When the pin is pushed by the lower mold part, the gap between the base and the pin decreases, and eventually the second end is in contact with the base. As a result, the relative retracing of the lower mold part (relative advancing of the upper mold part) stops. When the second end of the pin is in contact with the base, a surface of the upper mold part at a side facing the upper space and a surface of the lower mold part at a side facing the lower space are flush with each other.

The lower mold part slides as the pin slides. On the other hand, the upper mold part is in contact with the base and slides independently from the movement of the pin. In an initial state, no load is applied to the urging member, and a gap is formed between the second end of the pin and the base. Hence, the lower mold part protrudes toward the lower space by the thickness of the spacer as compared with the upper mold part. As a result, the step portion due to a difference between a location of the upper mold part and a location of the lower mold part is formed. The step portion has the same width as the thickness of the spacer.

When the interval between the pair of third mold parts is narrowed to some extent so that the density of the metal particles in the lower space increases, the lower mold part is pushed in the retracing direction, and the upper mold part relatively advances. Thus, the pin is also pushed toward the base, and the flange of the pin presses the urging member against the base via the spacer. On the other hand, the urging member pushes the pin back toward the lower space. By adjusting urging force of the urging member, pressure applied to the metal particles can be controlled. The relative advancing of the upper mold part ends when the second end of the pin reaches to be in contact with the base.

In the third step, a sliding controller of each of the third mold parts including the operating unit advances the third mold part. For example, the sliding controller advances an entirety of the third mold part by moving the base toward the molding space. That is, the upper mold part advances relative to the lower mold part while the entirety of the third mold part also advances, and the space decreases with time. Even after the second end of the pin reaches to be in contact with the base, the upper mold part and the lower mold part advance integrally.

Figure 6A:
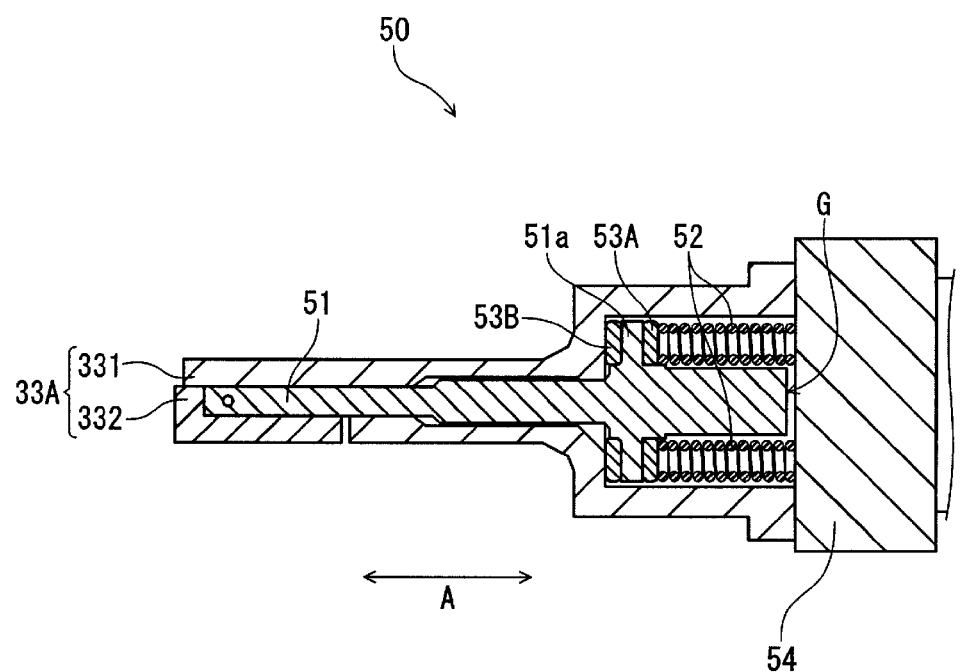
FIG. 6A is a cross-sectional view schematically showing an initial state of an operating unit of the third mold part according to the exemplary embodiment of the present disclosure.

FIG. 6A is a cross-sectional view schematically showing an initial state of the operating unit of the third mold part. FIG. 6A shows a case where operating unit 50 controls the operation of third mold part 33A, but the present disclosure is not limited to this.

Operating unit 50 includes pin 51 extending in sliding direction A of third mold part 33A, urging member 52, ring-shaped first spacer 53A, and base 54. Pin 51 as flange 51a located in a middle of pin 51. First spacer 53A is disposed on flange 51a at a side close to a second end of pin 51. Second spacer 53B may be disposed on flange 51a at a side close to a first end of pin 51. Urging member 52 is, for example, a coil spring, and is disposed between base 54 and first spacer 53A, and is in contact with base 54 and first spacer 53A.

A first end of pin 51 is in contact with a part of lower mold part 332 at a side opposite to the molding space. A second end of pin 51 is not in contact with base 54 when urging member 52 is in a no-load state, and gap G having a same width as the thickness of first spacer 53A is formed between base 54 and the second end of pin 51. The width of gap G (length in sliding direction A) is the same as width Wa of step portion 332a formed in third mold part 33A.

Figure 6B:
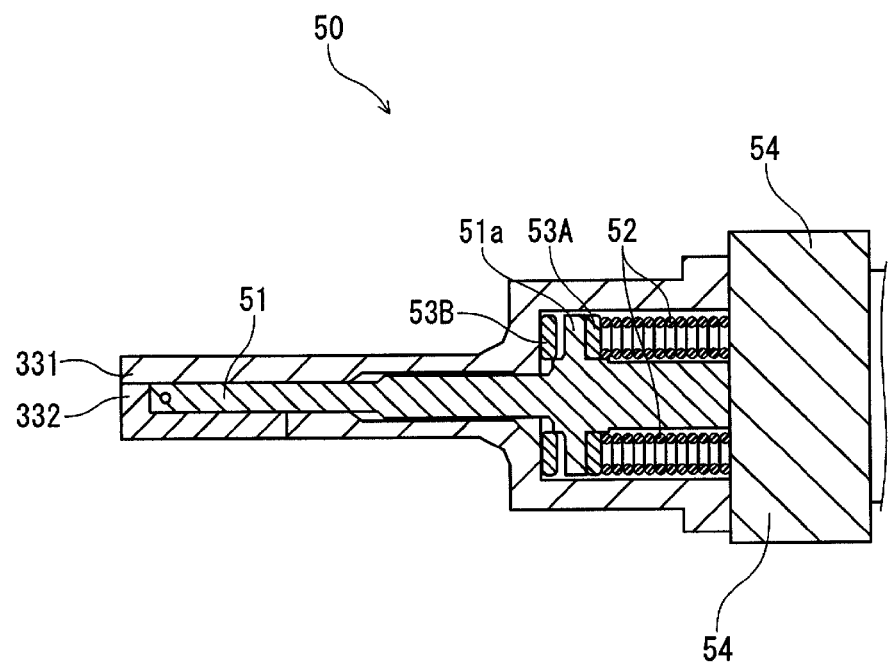
FIG. 6B is a cross-sectional view schematically showing the operating unit, at an end of operation, of the third mold part according to the exemplary embodiment of the present disclosure.

FIG. 6B is a cross-sectional view schematically showing the operating unit of the third mold part at an end of the operation.

When lower mold part 332 is pushed in the retracting direction, urging member 52 contracts to decrease gap G between pin 51 and base 54. The relative retracing of lower mold part 332 (relative advancing of upper mold part 331) ends when the second end of pin 51 is in contact with base 54. When the second end of pin 51 is in contact with base 54, the surface of upper mold part 331 at a side facing the upper space and the surface of the lower mold part 332 at a side facing the lower space are flush with each other.

<Manufacturing Method of Porous Sintered Body>
(4) Fourth Step

After removing all the molds, the molded body may be baked. As a result, a porous sintered body is obtained. Baking is performed, for example, in vacuum. A baking temperature and time are not particularly limited, and may be appropriately set according to the material of the metal particles and the like.

<Molded Body and Porous Sintered Body>

The molded body (and the porous sintered body which is the baked product thereof) includes an anode wire, a first surface on which the anode wire is planted, a second surface opposed to the first surface, a third surface and a fourth surface that are opposed to each other and intersect the first surface and the second surface, a fifth surface and a sixth surface that are opposed to each other and intersect the first surface, the second surface, the third surface, and the fourth surface.

When the molded body is produced by using the third mold part composed of an upper mold part and a lower mold part which are independently slidable and define the fifth or sixth surface, as in the present exemplary embodiment, a boundary line extending in the direction intersecting the longitudinal direction of the anode wire is formed on at least one surface of the fifth surface or the sixth surface of the molded body. This boundary line is derived from a boundary between the upper mold part and the lower mold part. When viewed from a normal direction of the fifth surface or the sixth surface, a region close to the first surface from the boundary line of the molded body is formed by pressure-molding of the metal particles filled in the upper space. Similarly, a region close to the second surface from the boundary line of the molded body is formed by pressure-molding the metal particles filled in the lower space.

When viewed from the normal direction of the fifth surface or the sixth surface, a ratio of shortest length La from the boundary line to the first surface in the longitudinal direction of the anode wire to shortest length Lb from the boundary line to the second surface in the longitudinal direction of the anode wire is not particularly limited, and depends on a ratio of height Ha of the upper mold part to height Hb of the lower mold part. The ratio of length La to length Lb (La:Lb) may range, for example, from 4:1 to 1:4 or from 2:3 to 1:3. Length Lb is preferably length La or more in a view of firmly fixing the anode wire. Ratio (La:Lb) may range, for example, from 1:1 to 1:4, or from 1:1 to 1:3.

When viewed from the normal direction of the fifth surface or the sixth surface, an end of the anode wire, which is embedded in the molded body, may be located in a region close to the second surface from the boundary line of the molded body. At this time, shortest distance H2a from the above-mentioned end of the anode wire to the second surface is shorter than length La (H2a<Lb). In this case, the anode wire is likely to be fixed more firmly. Shortest distance H2a may be ⅓ or less of the sum of length La and length Lb, and may be ¼ or less of the sum of length La and length Lb. From the viewpoint of fixing the anode wire, it is preferable that length Lb is length La or more, and the above-mentioned end of the anode wire is positioned in the region close to the second surface from the boundary line of the molded body.

Figure 8:
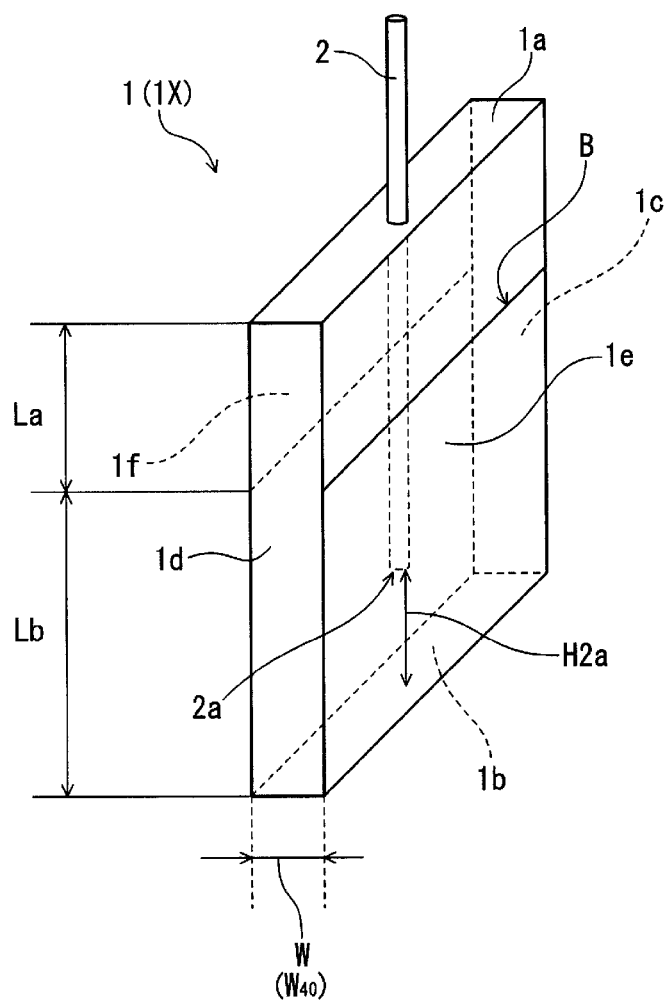
FIG. 8 is a perspective view schematically illustrating a molded body in which a part of an anode wire is embedded according to the exemplary embodiment of the present disclosure.

FIG. 8 is a perspective view schematically illustrating the molded body in which a part of the anode wire is embedded according to the exemplary embodiment.

Molded body 1 (and a baked product of molded body 1, which is porous sintered body 1X) has first surface 1a and second surface 1b, third surface 1c and fourth surface 1d, and fifth surface 1e and sixth surface 1f. Each of third surface 1c and fourth surface 1d is narrower than each of fifth surface 1e and sixth surface 1f. Molded body 1 has a flat shape and, for example, has a flat plate shape. A part of anode wire 2 is embedded in molded body 1, and a remaining part of anode wire 2 extends from first surface 1a of molded body 1 toward an outside.

Boundary line B extending in a direction intersecting a longitudinal direction of anode wire 2 is formed on each of fifth surface 1e and sixth surface if of molded body 1. When viewed from a normal direction of fifth surface 1e or sixth surface 1f, length Lb from each boundary line B to second surface 1b is longer than length La from the each boundary line B to first surface 1a (Lb>La). End 2a of anode wire 2 embedded in molded body 1 is located in a region close to second surface 1b from boundary line B of molded body 1. Shortest distance H2a from end 2a to second surface 1b is shorter than length La (H2a<Lb).

<Electrolytic Capacitor>

The porous sintered body obtained by the present exemplary embodiment is used, for example, for a capacitor element constituting an electrolytic capacitor.

Figure 7:
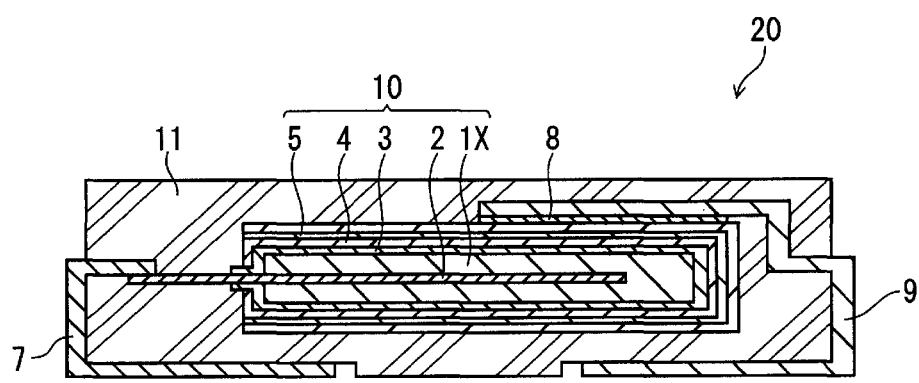
FIG. 7 is a cross-sectional view schematically illustrating an electrolytic capacitor using a porous sintered body according to the exemplary embodiment of the present disclosure.

FIG. 7 is a cross-sectional view schematically showing an electrolytic capacitor using the porous sintered body according to the present exemplary embodiment.

Electrolytic capacitor 20 has a substantially hexahedral outer shape including three sets of opposing flat surfaces, and includes capacitor element 10, resin outer body 11 that seals capacitor element 10, and anode terminal 7 and cathode terminal 9 that are partially exposed to an outside of resin outer body 11.

Capacitor element 10 includes porous sintered body 1X, which is an anode body in which a part of anode wire 2 electrically connected to anode terminal 7 is embedded, dielectric layer 3 formed on a surface of porous sintered body 1X, solid electrolyte layer 4 formed on a surface of dielectric layer 3, and cathode layer 5 formed on a surface of solid electrolyte layer 4.

Porous sintered body 1X is obtained by pressure-molding and baking valve metal particles such as tantalum, niobium, titanium, or alloys thereof, but the present disclosure is not limited to these metal particles.

A part of anode wire 2 protruding from porous sintered body 1X is electrically connected to anode terminal 7 by resistance welding or the like. Meanwhile, cathode layer 5 is electrically connected to cathode terminal 9 in resin outer body 11 via conductive adhesive 8 (for example, a mixture of a thermosetting resin and metal particles). Anode terminal 7 and cathode terminal 9 shown in FIG. 7 protrude from resin outer body 11, and are bent such that lower surfaces of anode terminal 7 and cathode terminal 9 are disposed on a same plane as a bottom surface of resin outer body 11. The lower surfaces of anode terminal 7 and cathode terminal 9 are used for solder connection with a substrate (not shown) on which electrolytic capacitor 20 is to be mounted, and the like.

(Dielectric Layer)

A dielectric layer can be formed as an oxide film by oxidizing a surface of a conductive material constituting the porous sintered body. Specifically, the porous sintered body is immersed in an anodization tank filled with an electrolyte solution (e.g., phosphoric acid aqueous solution), and the protruding anode wire is connected to the porous sintered body in the anodization tank to perform anodic oxidation, so that a dielectric layer made of an oxide film of a valve metal can be formed on a surface of the porous sintered body. As the electrolyte solution, not only the phosphoric acid aqueous solution but also, for example, nitric acid, acetic acid, and sulfuric acid can be used.

(Solid Electrolyte Layer)

The solid electrolyte layer is formed so as to cover the dielectric layer. The solid electrolyte layer is composed of, for example, manganese dioxide or a conductive polymer. A solid electrolyte layer containing a conductive polymer is formed on a dielectric layer, for example, by impregnating a porous sintered body on which a dielectric layer is formed with a monomer or an oligomer, and then polymerizing the monomer or the oligomer by chemical polymerization or electrolytic polymerization, or by impregnating a porous sintered body on which a dielectric layer is formed with a solution of a conductive polymer or dispersion liquid of a conductive polymer, and drying the solution or the liquid.

In the step of forming the dielectric layer and the solid electrolyte layer, for example, while a part of the anode wire protruding from the porous sintered body is grasped and the porous sintered body is suspended, a dielectric layer may be formed on the porous sintered body, and a solid electrolyte layer may be further formed on the dielectric layer. Hence, a large load is likely to apply a portion near a root of the anode wire. If the anode wire is not sufficiently fixed, cracks are likely to occur in the porous sintered body from the vicinity of the root of the anode wire, and leakage current is likely to increase. According to the present exemplary embodiment, since the anode wire is firmly fixed, the occurrence of cracks is also suppressed.

(Cathode Layer)

A cathode layer includes a carbon layer that is formed so as to cover a solid electrolyte layer and a metal paste layer that is formed on a surface of the carbon layer.

The carbon layer contains a conductive carbon material such as graphite and resin. For example, the metal paste layer contains metal particles (for example, silver) and resin. The cathode layer, however, is not limited to this configuration. The configuration of the cathode layer has only to have a current collection function.

Hereinafter, the present disclosure will be specifically described based on examples, but the present disclosure is not limited to the following examples.

Example 1

Molded body 1 (1X) shown in FIG. 8 was produced in which tantalum particles are pressure-molded using the mold shown in FIGS. 1A and 1B and has width W of 0.83 mm and a length of 5.17 mm in a direction perpendicular to width W. The operation of the pair of third mold parts was controlled by the operating unit shown in FIG. 6A. Minimum Initial interval W0 between the third mold parts was 5 mm. Width Wa of the step portion was set to 0.05 mm. The ratio of height Ha of the upper mold part to height Hb of the lower mold part Ha/Hb was about ½. Obtained molded body 1 (1X) was baked to prepare five porous sintered bodies A1.

Comparative Example 1

Five porous sintered bodies B were produced in the same manner as in Example 1 except that the third mold parts that were not divided into upper and lower parts were used.

[Evaluation]

The following evaluations were made on porous sintered bodies A1 and B.

(1) Breaking Strength

Figure 9:
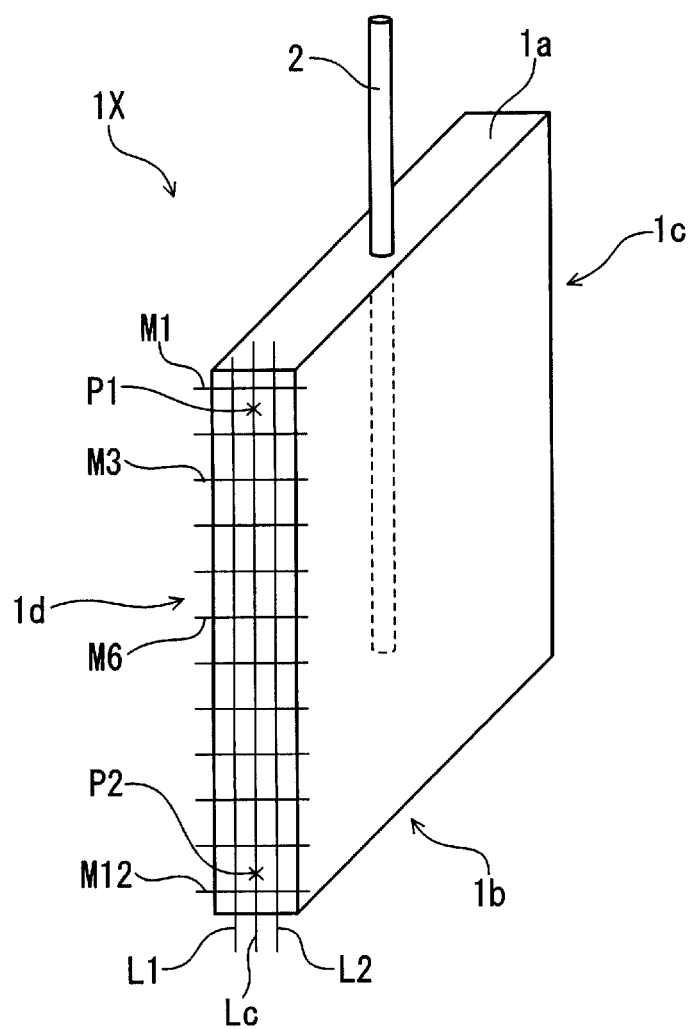
FIG. 9 is a perspective view schematically showing a porous sintered body for explaining an evaluation method in an example.

Three straight lines were drawn on the fourth surface of the porous sintered body in the longitudinal direction of the anode wire, and breaking strength was measured on point P1 which is on straight line Lc at a center and 0.5 mm away from the first surface, and on point P2 which is on straight line Lc at the center and 0.5 mm away from the second surface (see FIG. 9). Central straight line Lc bisects a width in a direction orthogonal to a longitudinal direction of the fourth surface. Two straight lines L1 and L2 each extending parallel to central straight line Lc were drawn to sandwich central straight line Lc, and each of the two straight lines L1 and L2 is disposed about 0.25 mm away from central straight line Lc.

The breaking strength was measured by pressing a compression terminal against the porous sintered body while applying a load using a tensile compression tester. When the porous sintered body breaks, the load applied to the compression terminal is the breaking strength. The breaking strength (relative value) at point P1 was calculated when the breaking strength at point P2 is 100%. The breaking strength (%) was taken as an average value of five porous sintered bodies. Results are shown in Table 1.

TABLE 1

|  | BREAKING STRENGTH AT POINT P1 (%) |
| --- | --- |
| POROUS SINTERED BODY A1 | 130 |
| POROUS SINTERED BODY B | 60 |

In porous sintered bodies A1, the breaking strength of a region close to the first surface (point P1) where the anode wire extends is slightly higher than the breaking strength of a region close to the second surface (point P2) at an opposite side. Thus, the anode wire is firmly fixed. Here, the breaking strength at point P1 is not excessively large as compared with point P2, and it can be said that the densities are almost uniform between the region close to the first surface and the region close to the second surface. On the other hand, in porous sintered bodies B, the breaking strength of the region close to first surface (point P1) where the anode wire extends is smaller than the breaking strength of the region (point P2) close to the second surface at the opposite side. That is, there is a relatively large difference in the breaking strength between point P1 and point P2.

(2) Vickers Hardness

Straight lines Lc, L1, and L2 were drawn on the fourth surface of the porous sintered body, and 12 straight lines M1 to M12 were drawn in the direction orthogonal to the longitudinal direction of the anode wire. Straight line M1 closest to the first surface was drawn 0.25 mm away from an end of the fourth surface at a side close to the first surface. Similarly, straight line M12 closest to the second surface was drawn 0.25 mm away from an end of the fourth surface at a side close to the second surface. The remaining ten straight lines were drawn so as to divide a portion between straight lines M1 and M12 into 11 equal parts. The Vickers hardness at each of thirty six intersection points of straight lines Lc, L1, and L2 and straight lines M1 to M12 was measured (see FIG. 9). The Vickers hardness was measured according to JIS Z 2244.

An average value of the Vickers hardness at nine intersection points of straight lines Lc, L1, and L2 and straight lines M1 to M3 (Vickers hardness HVa), and an average value of the Vickers hardness at 21 intersection points of straight lines Lc, L1, and L2 and straight lines M6 to M12 (Vickers hardness HVb) are calculated, and Vickers hardness HVa (relative value) is obtained when Vickers hardness HVb was set to 100%. The results are shown in Table 2. Vickers hardness HVa and Vickers hardness HVb were taken as average values of five porous sintered bodies.

TABLE 2

|  | VICKERS HARDNESS HVA(%) |
| --- | --- |
| POROUS SINTERED BODY A1 | 110 |
| POROUS SINTERED BODY B | 90 |

The Vickers hardness also shows the same tendency as the breaking strength. That is, in porous sintered bodies A1, the Vickers hardness in a region close to the first surface where the anode wire extends is slightly larger than the Vickers hardness in a region close to the second surface opposed to the first surface, but is not excessively large.

In porous sintered body A1, the region from the end of the fourth surface at the side close to the first surface to straight line M3 corresponds to a portion pressed by the upper mold part of molded body 1. In porous sintered body A1, the region from the end of the fourth surface at the side close to the second surface to straight line M6 corresponds to a portion pressed by the lower mold part of molded body 1. Since there is no significant difference between Vickers hardness HVa and Vickers hardness HVb, it can be seen that there is not much affection from division of the third mold part.

Examples 2 to 4

Porous sintered bodies A2 to A4 were prepared in the same manner as in the first example except that width Wa of the step portion was 0.14 mm, 0.3 mm, and 0.5 mm, respectively. When the braking strength of obtained porous sintered bodies A2 to A4 were measured in the same manner as above, the breaking strength at point P1 also increases as width Wa increases, and it can be seen that there is a correlation between width Wa and the breaking strength at point P1.

From the evaluation results of porous sintered bodies A2 to A4 and porous sintered bodies B, it can be seen that the breaking strength at the side close to the first surface of the porous sintered body can be increased by formation of even a small step portion in the third mold part.

The present disclosure can be used for an electrolytic capacitor having a porous sintered body as an anode body.

What is claimed is:

1. A mold that forms a molded body substantially having a rectangular parallelepiped shape, the molded body having:
    a first surface,
    a second surface opposed to the first surface,
    a third surface and a fourth surface that are opposed to each other and intersect the first surface and the second surface, and
    a fifth surface and a sixth surface that are opposed to each other and intersect the first surface, the second surface, the third surface, and the fourth surface,
    the mold defining a molding space that forms the molded body and comprising:
        a pair of first mold parts each defining a corresponding one of the first surface or the second surface;
        a pair of second mold parts each defining a corresponding one of the third surface or the fourth surface; and
        a pair of third mold parts each defining a corresponding one of the fifth surface or the sixth surface, wherein:
    at least one of the pair of third mold parts includes an upper mold part and a lower mold part, the upper mold part defining an upper part of the corresponding one of the fifth surface or the sixth surface, the lower mold part defining a lower part of the corresponding one of the fifth surface or the sixth surface, the upper mold part and the lower mold part being individually slidable, the upper part being closer to the first surface than the lower part is, the lower part being closer to the second surface than the upper part is,
    the lower mold part protrudes toward the molding space with respect to the upper mold part so that a step portion due to a difference between a location of the upper mold part and a location of the lower mold part is formed,
    the upper mold part is slidable relative to the lower mold part to make a size of the step portion decrease, and
    the upper mold part is slidable in cooperation with the lower mold part in a state in which the step portion is formed or absent.

2. The mold according to claim 1, wherein a length of the step portion in a sliding direction of the upper mold part ranges from 2% to 15%, inclusive, of a length of the molding space in the sliding direction.

3. The mold according to claim 1, wherein an area of each of the fifth surface and the sixth surface is larger than an area of each of the third surface and the fourth surface.

4. The mold according to claim 1, further comprising an operating unit that controls an operation of the upper mold part and the lower mold part, wherein:
    the operating unit includes a rod-shaped member extending in a sliding direction of the lower mold part, a spacer, an urging member, and a base,
    the rod-shaped member includes a flange,
    one end of the rod-shaped member is in contact with a part of the lower mold part at a side opposite to the molding space,
    another end of the rod-shaped member faces the base,
    the spacer is disposed between the flange and the base,
    the urging member is disposed between the base and the spacer being in contact with the base and the spacer,
    the mold forms a gap between the rod-shaped member and the base so that the step portion is formed in a no-load state of the urging member, the gap having a same width as a thickness of the spacer in the sliding direction of the lower mold part, and
    a length of the step portion in the sliding direction of the lower mold part is reduced in accordance with a load applied in a direction of contracting the urging member.

5. A manufacturing device of a molded body comprising:
    the mold according to claim 1; and
    a hopper that puts metal particles into a space partially defined by the mold.

6. A method for manufacturing a molded body using the mold according to claim 1, the method comprising:
    a first step of partially defining an initial space larger than the molding space by one of the pair of first mold parts, the pair of second mold parts, and the pair of third mold parts;
    a second step of putting metal particles into the initial space; and
    a third step of pressing the metal particles by advancing at least one of the pair of third mold parts in the initial space, wherein:
    in the first step, a step portion due to a difference between a location of the upper mold part and a location of the lower mold part is formed, and
    the third step includes:
        a step of integrally advancing the upper mold part and the lower mold part while the step portion remains,
        a step of advancing the upper mold part relative to the lower mold part to make a size of the step portion decrease while advancing the third mold part, and
        a step of integrally advancing the upper mold part and the lower mold part while the step portion is absent.

7. A method for manufacturing a porous sintered body, comprising a step of baking a molded body obtained by the manufacturing method according to claim 6.

* * * * *